UNITED STATES PATENT OFFICE.

THADDEUS SELLECK, OF GREENWICH, CONNECTICUT.

IMPROVEMENT IN PROTECTING SURFACES OF ARTICLES OF IRON.

Specification forming part of Letters Patent No. 24,665, dated July 5, 1859.

*To all whom it may concern:*

Be it known that I, THADDEUS SELLECK, of Greenwich, in the county of Fairfield and State of Connecticut, have invented, made, and applied to use a certain new and useful improvement in means for protecting the bearings of horseshoes and other iron articles from wear; and I do hereby declare that the following is a full, clear, and exact description of the nature and operation of the said invention.

In the manufacture of horseshoes it has heretofore been usual to weld on steel calks to protect the bearing-points from wear; but the said operation is costly and the steel requires hardening. To effect this object I inserted holes or cavities in the bearing parts of an ordinary horseshoe, and at each point placed a lump of the metal known as "franklinite pig metal," (which is of a very hard and brittle texture,) and melted the same, adding a small quantity of borax, when, on cooling, the said franklinite pig metal was found to be incorporated with the wrought-iron in such a firm manner that it could not be separated, notwithstanding the fact that under very severe and repeated blows the thin film of franklinite pig metal in some places was cracked and disintegrated, from its brittle nature. In view of these facts, it became apparent that the exceedingly hard and brittle franklinite pig metal might be applied to and combined with a wrought-iron matrix as a surface coating at such points as are exposed to wear, and the peculiar properties possessed by this metal of flowing into and filling the pores of the iron and uniting any imperfect welds or seams in wrought-iron render the same efficient to braze pieces of iron together, on account of melting at a lower temperature and being so exceedingly strong, hard, and durable, particularly under circumstances of exposure to wear or abrasure.

My invention therefore relates to the discovery of the properties possessed by the franklinite pig metal of uniting with the surface of iron when melted, and the application thereof to the useful purposes set forth, under circumstances where great strength and dura bility under abrasion are required, or, in othe words, using iron possessing the requisit strength as a matrix to receive the franklinit pig metal, in which the wear comes, but whicl of itself is too brittle to be used alone.

In carrying out this invention the iron ma; be heated to the welding-point and the melte franklinite pig metal poured into or onto th same; or the melting may be effected of th franklinite pig metal while on the iron. I almost all instances the nature of the frank linite pig metal renders hardening unnece: sary.

My invention may be applied to form th calks of horses' shoes, to strengthen and pr vent battering the ends of railroad-bars, 1 form a surface on such bars or on the tires carriages, cars, &c., and for a variety of pu poses wherever available.

I do not claim mixing franklinite pig met with ordinary cast-iron while both are in melted state to form a compound or allo: Neither do I claim casting steel onto the su face of iron, as this has before been done; b the costly character of steel, the high temper ture at which it melts, and the difficulty working render its use under the circumstanc herein set forth both costly and difficult, if n impossible. Therefore

What I claim as my invention, and desi to secure by Letters Patent, as a new article manufacture, is—

A horseshoe or other article, as indica t herein, made by uniting franklinite 1 metal with the surface of iron, as set forth.

In witness whereof I have hereunto set 1 signature this 15th day of February, 1859.

THADDEUS SELLECK.

Witnesses:
LEMUEL W. SERRELL,
CHAS. H. SMITH.